Figure 1:
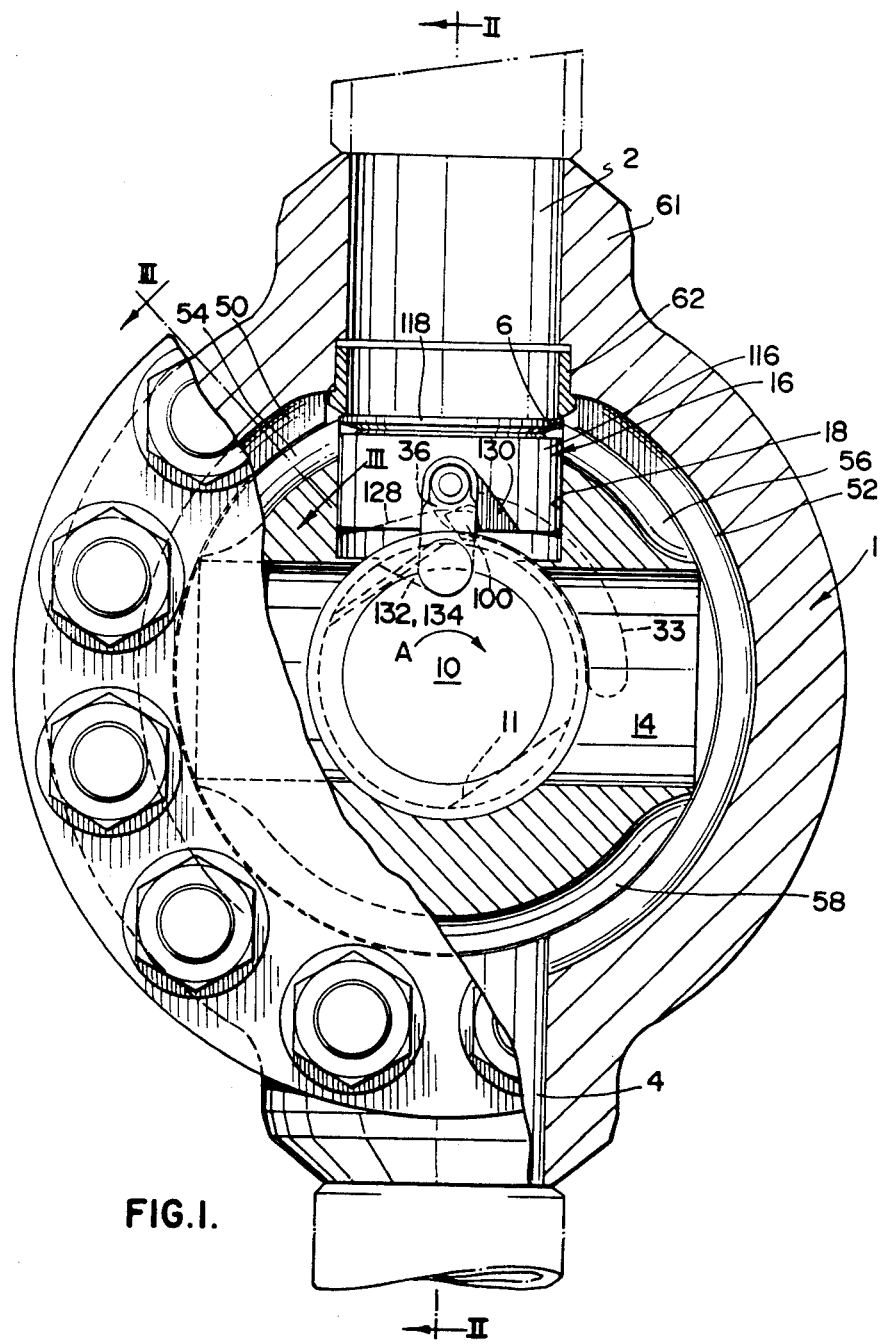

United States Patent [19]

Whittaker et al.

[11] 3,894,714

[45] July 15, 1975

[54] ROTARY VALVE

[75] Inventors: Stanley J. Whittaker; Cyril J. Astill, both of Deep River, Canada

[73] Assignee: Atomic Energy of Canada Limited, Ottawa, Canada

[22] Filed: Dec. 18, 1974

[21] Appl. No.: 533,813

Related U.S. Application Data

[63] Continuation-in-part of Ser. No. 418,614, Nov. 23, 1973, abandoned.

[30] Foreign Application Priority Data
Mar. 14, 1973 Canada .............................. 166040

[52] U.S. Cl. .................. 251/86; 251/163; 251/231
[51] Int. Cl.² ........................................ F16K 25/00
[58] Field of Search ............. 251/86, 162, 163, 231

[56] References Cited
UNITED STATES PATENTS

| | | | |
|---|---|---|---|
| 2,505,998 | 5/1950 | Sleeper .............................. | 251/163 |
| 3,430,658 | 3/1969 | Selt ..................................... | 251/163 X |
| 3,675,894 | 7/1972 | Friedell .............................. | 251/163 |
| 3,746,302 | 7/1973 | Larsen ............................. | 251/163 X |
| 3,776,505 | 12/1973 | Nakauishi ......................... | 251/163 |

FOREIGN PATENTS OR APPLICATIONS

| | | | |
|---|---|---|---|
| 1,345,773 | 11/1963 | France .............................. | 251/163 |

*Primary Examiner*—Harold W. Weakley
*Attorney, Agent, or Firm*—Francis W. Lemon

[57] ABSTRACT

A rotary valve having two, rotatable coaxial plugs in a casing with a piston slidable radially in the outer plug and connected by side links to the inner plug. The piston, which has the valve seating, is pivotally attached to the outer ends of the links by cam followers which are located in cam tracks having corner portions leading from a sealing surface in the casing fluid inlet and then curved portions extending round the axis of rotation of the plugs. Rotation of the inner plug from the closed position aligns fluid passages through the plugs with the casing inlet and outlet, by moving the cam followers down the corner portions of the cam tracks, to draw the piston away from the sealing surface after the links have snapped over top dead centre, and then along the curved portions, thus opening the valve.

5 Claims, 3 Drawing Figures

3,894,714

ROTARY VALVE

This application is a continuation-in-part of application Ser. No. 418,614, filed 11/23/73, now abandoned.

This invention relates to rotary valves.

There is a need for a rotary valve having a high reliability for the containment of fluids in a fluidtight manner. For example, there is a particular need for a rotary valve having a high reliability for the containment of fluids in a fluidtight manner for use in nuclear reactors, for the containment of costly heavy water, fluids such as tritium having high toxicity, and other applications where liquids or gases having high toxicity, corrosiveness or pollutant properties must be contained, or wherein it is not possible to use sealing members of organic materials, such as elastomeric materials, or siloxane resins, which deteriorate under ionizing radiation and/or exposure to ozone.

It is an object of the present invention to provide a rotary valve having high reliability for the containment of fluids in a fluidtight manner.

It is a further object, for some of the embodiments of the present invention, to provide a rotary valve having high reliability for the containment of costly heavy water, fluids containing tritium having high toxicity, and other applications where liquids or gas having high toxicity, corrosiveness or pollutant properties must be contained, and wherein it is not possible to use sealing members of organic materials, such as elastomeric materials or siloxane resins, which deteriorate under ionizing radiation and/or exposure to ozone.

It would also be desirable to provide a rotary valve with which there is substantially no rubbing or scuffing between the sealing surfaces during opening or closing the valve, which could damage the sealing surfaces and cause leakage.

It is a further object of the present invention to provide a rotary valve with which there is substantially no rubbing or scuffing between the sealing surfaces during opening or closing of the valve, which could damage the sealing surfaces and cause leakage.

According to the present invention there is provided a rotary valve, comprising a rotary valve casing having a fluid inlet, a fluid outlet and an inwardly facing sealing surface around the fluid inlet, an inner plug having an inner fluid passage and rotatably mounted in the casing for aligning the inner fluid passage with the fluid inlet and fluid outlet, an outer plug having an outer fluid passage and rotatably mounted in the casing for rotation about the inner plug for aligning the outer fluid passage, with the inner fluid passage and the fluid inlet and fluid outlet, the inner and outer plugs being mounted for rotation about a common axis, a valve closure assembly slidably located in a radially extending recessed portion of the outer plug with the recessed portion circumferentially spaced around the outer plug from the fluid passage therein, the valve closure assembly being slidably located for movement into sealing engagement with the sealing surface, a pair of link members in the casing with the inner and outer plugs and valve closure assembly between them, pivot means pivotally attaching the link members at their inner ends to the inner plug, for rotation about an axis parallel to the common axis of rotation of the inner and outer plugs, cam track following means pivotally attaching the outer ends of the link members to the valve closure assembly, through radial slots in the outer plug, and extending radially along the axis of the recessed portion, for rotation about an axis parallel to the common axis of rotation of the inner and outer plugs, two cam tracks facing one another from the inside of the casing with one of the cam tracks on each side of the outer plug and the cam track following means slidably located at each end in the cam track, the cam tracks having corner portions adjacent the fluid inlet, leading away from the sealing surface and then curved portions extending around the common axis of rotation of the inner and outer plugs to a position where the valve is fully open, and valve actuating means for rotating the inner plug, and whereby rotation of the inner plug, by the valve actuating means, from the closed position of the valve, causes the link members first to be guided over top dead centre and inwardly by the cam following means moving inwardly around the cam track corner portions so that the valve closure assembly is released inwardly from sealing engagement with the sealing surface and slid into the recessed portion by relative rotation between the inner and outer plugs, and further rotation of the inner plug causes the link members to move the cam track following means around the cam track curved portions and align the fluid passages in the inner and outer plugs with the fluid inlet and outlet passages, and reverse rotation of the inner plug reverses this sequence until the valve is closed by the valve closure assembly being snapped into sealing engagement with the sealing surface by the link members snapping over top dead centre.

Figure 2:
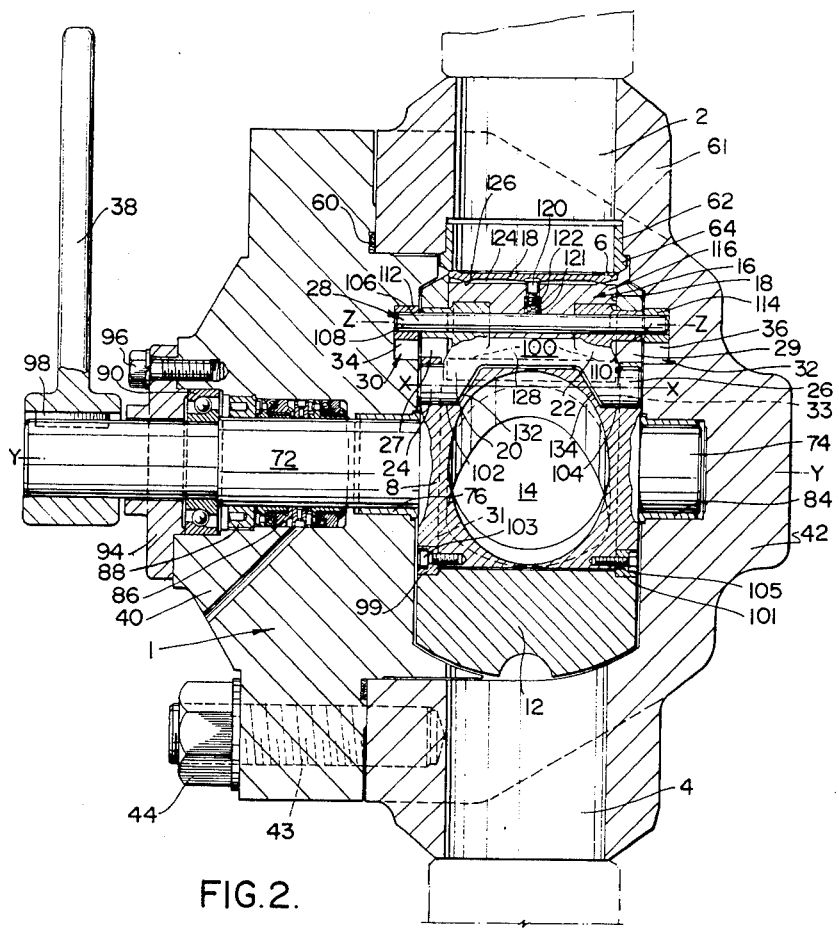
Figure 3:
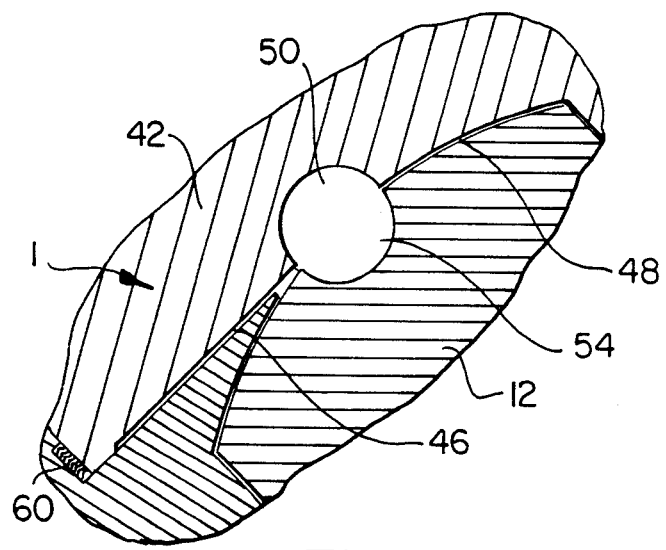

In the accompanying drawings which illustrate, by way of example, an embodiment of the present invention:

FIG. 1 is a partly sectioned side view of a rotary valve in the closed position, FIG. 2 is a part sectional end view along II—II, FIG. 1, and FIG. 3 is a sectional view along IV—IV, FIG. 3, showing portions of the casing and outer plug.

Referring to FIGS. 1 to 3 there is shown a rotary valve with a rotary valve casing generally designated 1 having a fluid inlet 2, a fluid outlet 4 and an inwardly facing sealing surface 6 around the fluid inlet 2. An inner plug 8 has an inner fluid passage 10 bounded by an inner plug surface 11 and is rotatably mounted in the casing 1 for aligning the inner fluid passage 10 with the fluid inlet 2 and the fluid outlet 4. An outer plug 12 has an outer fluid passage 14 and is rotatably mounted in the casing 1 for rotation about the inner plug 8 for aligning the inner and outer fluid passages 10 and 14 respectively and the fluid inlet 2 and fluid outlet 4. The inner and outer plugs, 8 and 12 respectively, are mounted for rotation about a common axis YY. A valve closure assembly 16 is slidably located in a radially extending recessed portion 18 of the outer plug 12 with the recessed portion 18 circumferentially spaced around the outer plug 12 from the fluid passage 14. The valve closure assembly 16 is slidably located for movement into engagement with the sealing surface 6 as will be described later. A pair of link members 20 and 22 are in the casing 1 with the inner and outer plugs 8 and 12 respectively, and the valve closure assembly, 16 between them. Pivot means 24 and 26 pivotally attach the link members 20 and 22 respectively at their inner ends to the inner plug 8, for rotation about an axis XX parallel to the common axis YY of rotation of the inner and outer plugs 8 and 12 respectively. Cam track following means generally designated 28 pivotally attaches the outer ends of the link members 20 and 22 to the valve closure assembly 16, through radial slots 27 and 29 in the outer plug 12 extending radially along the axis of the recessed portion 18, for rotation about an axis ZZ parallel to the common axis YY of rotation of the inner and outer plugs 8 and 12 respectively. Two cam tracks 30 and 32 face one another from the inside of the casing 1 with one of the cam tracks 30 and 32 on each side of the outer plug 12 and the cam track following means 28 slidably located at each end in the cam tracks 30 and 32. The cam tracks 30 and 32 have corner portions 34 and 36 respectively, adjacent the fluid inlet 2, leading in an axially in line direction away from the sealing surface 6 and then curved portions 31 and 33 which extend around the common axis YY of rotation of the inner and outer plugs 8 and 12 respectively to a position where the valve is fully opened. Valve actuating means in the form of a lever 38 is provided for rotating the inner plug 8.

The valve casing 1 comprises two side portions 40 and 42 secured together by bolts 43 and nuts 44. As shown in FIG. 3 the portion 40 locates inside the side portion 42 to provide close fitting, spaced curved surfaces 46 and 48 for the outer plug 12. The side portion 42 has leakage grooves 50 and 52 which during rotation of the outer plug 12 align with leakage grooves 54, 56 and 58 in the outer plug 12 as will be described later. The side portions 40 and 42 are sealed together by a seal 60.

The fluid inlet 2 is in the side portion 42 and extends along a boss 61. The inwardly facing sealing surface 6 is a flat end surface of an annular metal insert 62 in the fluid inlet 2. The metal insert 62 is removably located in the side portion 42 by a collar 64.

The fluid outlet 4 of the casing 1 is also in the side portion 42 and extends along a boss 68.

The inner plug 8 is rotatably mounted in the casing 1 by axles 72 and 74. The axle 72 is rotatably mounted by a radial bearing 76 and ball thrust bearing 90 in the side portion 40. The axle 74 is rotatably mounted in the side portion 42 by radial bearing 84.

The axle 72 is sealed in the side portion 40 by a grease pressurized seal assembly 86 retained in the portion 40 by a threaded ring 88. An outer end portion of the axle 72 is mounted in the side portion 40 by the ball thrust bearing 90, which is held captive in the side portion 40 by a plate 94 and bolts 96, and which resists axial thrust from fluid pressure within the valve casing 1 when the valve is open. The lever 38 is secured on the axle 72 by a key 98.

The link members 20 and 22 are joined together by a bridge member 100 extending over the inner plug 8.

The inner plug 8 has two rings 99 and 101 secured thereon by bolts 103 and 105. The pivot means 24 and 26, which are in the form of stub axle extensions of the link members 20 and 22, are pivotally located in recesses 102 and 104 respectively in the inner plug 8 and rings 99 and 101.

The cam track following means 28 comprises a shaft 106 extending through the link members 20 and 22 having two stub axle end portions 108 and 110 upon which two rollers 112 and 114 respectively, are rotatably mounted. The shaft 106 has the valve closure assembly 16 rotatably mounted on it. The rollers 112 and 114 are slidably located in the cam tracks 30 and 32.

The valve closure assembly 16 comprises a piston 116 slidably located in the recessed portion 18, a valve seating diaphragm 118 loosely secured to the piston 116 by a threaded extension 120 and nut 122 with locking ring 121. The diaphragm 118 is loosely secured to the piston 116 in order that the diaphragm will deflect when pressed against the sealing surface 6. The piston 116 has a shallow, central concavity 124 in its upper surface, and the shallow, central concavity 124 in its upper surface, and the shallow concavity 12 has an annular ridge 126 therearound spaced marginally inwardly from the sealing surface 6 and deflecting an outer rim portion of the diaphram 118 downwardly when it is in contact with the sealing surface 6, when the valve is in the closed position, and the annular ridge 126 is being urged upwardly by the piston 116. This arrangement has the advantage that fluid pressure at the fluid inlet 2 deflects the centre portion of the diaphragm 118 downwardly and thus enhances the seal by urging the outer rim portion of the diaphragm 118 against the sealing surface 6 with greater force when the fluid pressure at the fluid inlet 2 increases.

For reasons to be described later, the diaphragm 118 preferably should not obscure any portion of the leakage groove 56 when the valve is in the open position. Thus with the valve in the open position the piston 116 preferably should hold the diaphragm 118 at least as low as the bottom of the leakage groove 56, and in order to do this it is necessary for the piston 116 to have recess 128 to receive the inner plug 8. The piston 116 has a further recesses, one of which is shown and designated 130, to receive the link members 20 and 22. The inner plug 8 has slots 132 and 134 to receive the link members 20 and 22, respectively.

In operation, to open the valve 1 from the closed position shown in FIGS. 1 to 4, the lever 38 is pulled to rotate the inner plug 8 in the direction of arrow A (FIG. 1).

For approximately the first two degrees of rotary movement of the inner plug 8 the links 20 and 22 are drawn over top dead center, that is from the over centre position, slightly downwardly to the left (FIG. 1), to be slightly inclining downwardly to the right and thus unlock the valve closure assembly 16 from the sealing surface 6. Continued rotary movement of the inner plug 8 for approximately the next eight degrees causes, the rollers 112 and 114 to move radially inwardly around the corner portions 34 and 36 of the cam tracks 30 and 32 respectively so that the links 20 and 22 release the valve closure assembly 16 from sealing engagement with the sealing surface 6 and slide the valve closure assembly 16 radially inwardly, i.e., only in an axially in line direction away from the sealing surface 6, in the recessed portion 18 until the rollers 112 and 114 have moved to the bottom of the corner portions 34 and 36 respectively. This is caused by relative movement between the inner plug 8 and outer plug 12 with the outer plug 12 stationary. At the same time that the valve closure assembly 16 is being moved radially inwardly at the bottom of the recessed portion 18 the outer plug 12 also starts to be pulled round by a lost motion effect in the rollers 112 and 114 moving along the cam tracks 30 and 32 at the bottoms of the corner portions 34 and 36, thus relative rotation occurs between the inner plug 8 and the outer plug 12. This lost motion effect is caused by the rollers 112 and 114 dragging against the lower sides of the cam tracks 30 and 32 and so the outer plug 12 does not commence moving until the rollers 112 and 114 start moving around curved portions 31 and 33.

Continued rotary movement of the lever 38 rotates the inner plug 8 and the outer plug 12 at different speeds in the casing 1 with the rollers 112 and 114 passing round the curved portions 31 and 33 of the cam tracks 30 and 32 respectively, and the valve closure assembly 16 continues moving into the recess 18. When the rollers 112 and 114 have passed completely round the curved portions 31 and 33 respectively, the inner fluid passage 10 and outer fluid passage 14 are aligned with the fluid inlet and outlet passages 2 and 4 respectively by rotation of both the inner plug 8 and the outer plug 12 and the piston 116 is at the bottom of the recess 18. The valve is now in the open position.

It will be appreciated that by pulling the lever 38 in the opposite direction to arrow A, from the position where the valve is open, the above sequence of movements is reversed until the links 20 and 22 snap over top dead center and lock the valve closure assembly 16 in the valve closed position.

It should be noted that as the valve 1 is closing fluid is allowed to pass round the leakage grooves 50, 52, 54 and 56 so that there is no sudden sealing off of fluid pressure at the fluid inlet during closing, and this facilitates smooth closing of the valve with a more evenly applied torque to the lever 38. For this reason the diaphragm 118 should preferably not obscure any portion of the leakage groove 56 when the valve is in the open position.

It will be appreciated that, instead of a lever 38, the valve actuating means may be, for example, an electric motor coupled to an outer end of the axle 72.

In other embodiments of the present invention the link members 20 and 22 are not joined together by the bridge member 100.

We claim:

1. A rotary valve, comprising a rotary valve casing having a fluid inlet, a fluid outlet and an inwardly facing sealing surface around the fluid inlet, an inner plug having an inner fluid passage and rotatably mounted in the casing for aligning the inner fluid passage with the fluid inlet and fluid outlet, an outer plug having an outer fluid passage and rotatably mounted in the casing for rotation about the inner plug, for aligning the outer fluid passage with the inner fluid passage and the fluid inlet and fluid outlet, the inner and outer plugs being mounted for rotation about a common axis, a valve closure assembly slidably located in a radially extending recessed portion of the outer plug with the recessed portion circumferentially spaced around the outer plug from the fluid passage therein, the valve closure assembly being slidably located for movement into sealing engagement with the sealing surface, a pair of link members in the casing with the inner and outer plugs and valve closure assembly between them, pivot means pivotally attaching the link members at their inner ends to the inner plug, for rotation about an axis parallel to the common axis or rotation of the inner and outer plugs, cam track following means pivotally attaching the outer ends of the link members to the valve closure assembly, through radial slots in the outer plug and extending radially along the axis of the recessed portion, for rotation about an axis parallel to the common axis of rotation of the inner and outer plugs, two cam tracks facing one another from the inside of the casing with one of the cam tracks on each side of the outer plug and the cam track following means slidably located at each end in the cam tracks, the cam tracks having corner portions, adjacent the fluid inlet, leading in an axial in line direction away from the sealing surface and then curved portions extending around the common axis of rotation of the inner and outer plugs to a position where the valve is fully open, and valve actuating means for rotating the inner plug, and whereby rotation of the inner plug, by the valve actuating means, from the closed position of the valve, causes the link members first to be guided over top dead centre and inwardly by the cam following means moving inwardly around the cam track corner portions so that the valve closure assembly is released inwardly from sealing engagement with the sealing surface, and moved only in an axially in line direction away from the sealing surface into the recessed portion by relative rotation between the inner and outer plugs with the outer plug stationary, and further rotation of the inner plug rotates the outer plug and causes the link members to move the cam track following means around the cam track curved portions and align the fluid passages in the inner and outer plugs with the fluid inlet and outlet passages, and reverse rotation of the inner plug reverses this sequence until the valve is closed by the valve closure assembly being snapped into sealing engagement with the sealing surface by the link members snapping over top dead centre.

2. A rotary valve according to claim 1, wherein fluid leakage grooves extend circumferentially around the outer plug to leak fluid from the fluid inlet to the fluid outlet during and until the valve is closed.

3. A rotary valve according to claim 1, wherein a bridge member extending over the inner plug joins the two link members together.

4. A rotary valve according to claim 1, wherein the valve closure assembly comprises a piston slidably located in the recess, and a valve seating diaphragm loosely secured to the piston to lie flush with the sealing surface.

5. A rotary valve according to claim 1, wherein the piston has a shallow central concavity, adjacent the diaphragm, and an annular ridge around the concavity and spaced marginally inwardly from the sealing surface.

* * * * *